United States Patent
Berke et al.

(10) Patent No.: US 9,825,730 B1
(45) Date of Patent: Nov. 21, 2017

(54) SYSTEM AND METHOD FOR OPTIMIZING LINK PERFORMANCE WITH LANES OPERATING AT DIFFERENT SPEEDS

(71) Applicant: DELL PRODUCTS, LP, Round Rock, TX (US)

(72) Inventors: Stuart Allen Berke, Austin, TX (US); Bhyrav M. Mutnury, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/276,329

(22) Filed: Sep. 26, 2016

(51) Int. Cl.
*H04L 1/00* (2006.01)
*H04L 1/20* (2006.01)

(52) U.S. Cl.
CPC ............ *H04L 1/0002* (2013.01); *H04L 1/203* (2013.01)

(58) Field of Classification Search
CPC ... H04L 1/0002; H04L 25/028; H04L 1/0057; H04L 1/0003; H04L 25/4917; H04L 1/0067; H04B 10/40; H04B 1/38
USPC .......................... 375/219–224, 257
See application file for complete search history.

(56) References Cited

U.S. PATENT DOCUMENTS

| | | | |
|---|---|---|---|
| 5,761,209 A * | 6/1998 | Murakami | H03M 9/00 370/536 |
| 6,208,621 B1 * | 3/2001 | Ducaroir | G06F 1/04 370/241 |
| 6,393,502 B1 * | 5/2002 | Meyer | G06F 13/4059 365/221 |
| 6,456,987 B1 * | 9/2002 | Pauschinger | G07B 17/00193 705/408 |
| 6,731,688 B1 * | 5/2004 | Johnson | H04L 1/0002 370/468 |
| 7,013,359 B1 * | 3/2006 | Li | G06F 13/4243 710/305 |
| 7,190,754 B1 * | 3/2007 | Chang | H03L 7/07 375/371 |
| 7,254,691 B1 * | 8/2007 | Ebeling | G06F 12/0646 341/100 |
| 7,277,031 B1 * | 10/2007 | Lo | H04L 7/0337 341/100 |
| 7,295,578 B1 * | 11/2007 | Lyle | G06F 3/14 348/473 |
| 7,308,058 B2 * | 12/2007 | Zerbe | H04L 1/0003 375/259 |
| 7,362,779 B1 * | 4/2008 | Zabezhinsky | H04J 3/1611 370/512 |

(Continued)

FOREIGN PATENT DOCUMENTS

WO    WO 2013/095422 A1    6/2013

*Primary Examiner* — Emmanuel Bayard
(74) *Attorney, Agent, or Firm* — Larson Newman, LLP

(57) ABSTRACT

A serial communication link includes a receiver and a transmitter coupled to the receiver by a first serial communication lane operating at a first speed, and a second serial communication lane operating at a second speed. The second speed is slower than the first speed. The transmitter can include bit steering logic that receives a data stream, provides a first number of bits of the data stream to the first serial communication lane, and provides a second number of bits to the second serial communication lane. The proportion of the first number of bits to the second number of bits is the same as a proportion of the first speed to the second speed.

20 Claims, 8 Drawing Sheets

(56) References Cited

U.S. PATENT DOCUMENTS

| | | | | |
|---|---|---|---|---|
| 7,558,281 | B2* | 7/2009 | Dropps | G06F 13/385 370/422 |
| 7,599,439 | B2* | 10/2009 | Lavelle | G06F 3/14 375/240.26 |
| 7,759,972 | B1* | 7/2010 | Shumarayev | H03K 19/177 326/41 |
| 7,966,047 | B2* | 6/2011 | Demuynck | G06F 1/1616 455/575.1 |
| 8,069,379 | B2* | 11/2011 | Perego | G06F 13/1678 710/14 |
| 8,571,059 | B1* | 10/2013 | Zaliznyak | G06F 13/385 370/464 |
| 8,659,768 | B2* | 2/2014 | Niitsuma | H04N 1/33376 358/1.13 |
| 8,738,988 | B2* | 5/2014 | Lin | H04L 1/0067 714/52 |
| 9,065,682 | B2* | 6/2015 | Mahesh | H04L 12/6418 |
| 9,088,445 | B2* | 7/2015 | Chun | G06F 13/4086 |
| 9,292,465 | B2 | 3/2016 | Trivedi et al. | |
| 2001/0055272 | A1* | 12/2001 | Matsuno | H04J 3/14 370/216 |
| 2004/0013133 | A1* | 1/2004 | Fimoff | H04J 3/1682 370/473 |
| 2004/0078716 | A1* | 4/2004 | Schulze | G06F 11/267 714/43 |
| 2008/0205437 | A1* | 8/2008 | Cole | H04J 3/047 370/464 |
| 2010/0005238 | A1* | 1/2010 | Jeddeloh | G06F 13/4022 711/111 |
| 2010/0129062 | A1* | 5/2010 | Nakajima | H04N 5/46 386/241 |
| 2012/0224582 | A1* | 9/2012 | Diab | H04L 12/40136 370/395.1 |
| 2013/0080665 | A1* | 3/2013 | Park | G06F 13/14 710/60 |
| 2013/0139032 | A1* | 5/2013 | Tsern | G06F 11/1008 714/764 |
| 2013/0216235 | A1* | 8/2013 | Ishida | H04B 15/04 398/130 |
| 2013/0346659 | A1* | 12/2013 | Sasaki | G06F 13/4068 710/110 |
| 2014/0105101 | A1* | 4/2014 | Vu | H04L 1/0008 370/328 |
| 2014/0281052 | A1 | 9/2014 | Debendra | |
| 2015/0341277 | A1* | 11/2015 | Gravel | H04J 47/25 370/468 |
| 2016/0020927 | A1* | 1/2016 | Shiozaki | H04L 25/028 375/297 |
| 2016/0170918 | A1 | 6/2016 | Butcher et al. | |

* cited by examiner

SYSTEM AND METHOD FOR OPTIMIZING LINK PERFORMANCE WITH LANES OPERATING AT DIFFERENT SPEEDS

FIELD OF THE DISCLOSURE

This disclosure generally relates to information handling systems, and more particularly relates to optimizing the performance of a serial communication link.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include a serial communication link that operates to communicate data between devices of the information handling system or between the information handling system and another information handling system. The serial communication link can include one or more data communication lanes.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The following description in combination with the Figures is provided to assist in understanding the teachings disclosed herein. The use of the same reference symbols in different drawings indicates similar or identical items.

SUMMARY

A serial communication link may include a receiver and a transmitter. The transmitter may be coupled to the receiver by a first serial communication lane operating at a first speed, and by a second serial communication lane operating at a second speed. The second speed may be slower than the first speed. The transmitter may include bit steering logic. The bit steering logic may receive a data stream, provide a first number of bits of the data stream to the first serial communication lane, and provide a second number of bits to the second serial communication lane. The proportion of the first number of bits to the second number of bits may be the same as a proportion of the first speed to the second speed.

DETAILED DESCRIPTION OF DRAWINGS

For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
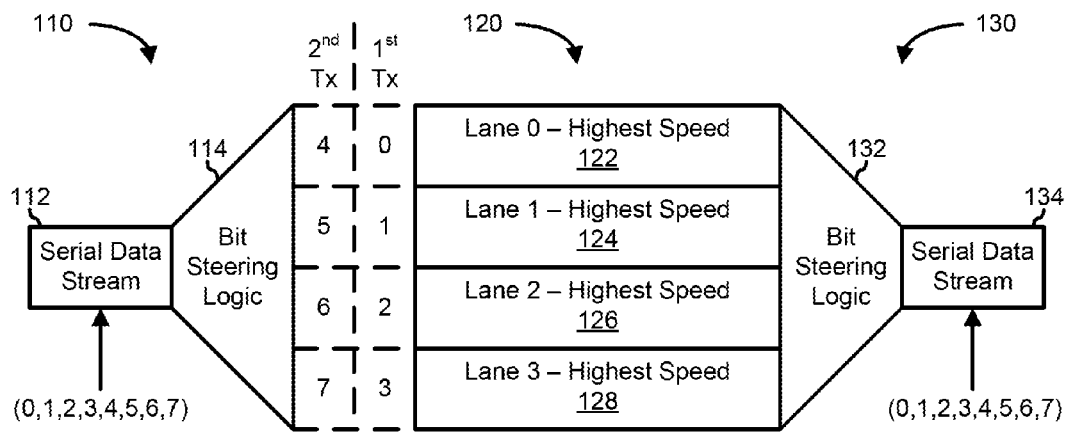
FIG. 1 is a block diagram of a serial communication link according to an embodiment of the present disclosure.

FIG. 1 illustrates a serial communication link 100 including a transmitter 110 in a first device, a channel 120 between the first device and a second device, and a receiver 130 in the second device. Transmitter 110 includes a serial data stream source 112 and a bit steering logic 114. Channel 120 includes four serial communication lanes (lanes) 122, 124, 126, and 128. Receiver 130 includes bit steering logic 132, and a serial data stream receiver 134. Link 100 can include more or fewer lanes, as needed or desired. As described herein, when a link is described as being between different devices, it will be understood that the link represents a communication path for communicating data from a first device of an information handling system to a second device of the information handling system, for communicating data within a device of an information handling system, for communicating data from a first information handling system to a second information handling system or to another device external to the first information handling system, or for communicating data between other types of devices, as needed or desired. Further, it will be understood that, where bi-directional communication of data between devices is needed or desired, there may be a complimentary link between the devices including a transmitter in the second device, a channel between the second device and the first device, and a receiver in the second device. An example of link 100 includes a Peripheral Component Interconnect—Express (PCIe) serial communication link, including a ×2 (2-lane) link, a ×4 (4-lane) link, a ×8 (8-lane) link, or a ×16 (16-lane) link, an InfiniBand communication link, including a 4× aggregate link or a 12× aggregate link, a Fibre Channel link, a Cache Coherency Interconnect for Accelerators (CCIX) link, another cache or processor coherency link, or another serial communication link, as needed or desired.

Serial data stream source 112 represents logic or circuitry of receiver 110 that receives data and provides the data to be communicated over link 100. Serial data stream 112 is shown receiving a bit stream (0,1,2,3,4,5,6,7) of binary data (i.e., a stream of eight digital 0s and digital 1s). Bit steering logic 114 represents logic or circuitry of receiver 110 that steers the bit stream to each of lanes 122, 124, 126, and 128 successively. Thus, as shown, bit steering logic 114 provides the first four (4) bits (0,1,2,3) of the bit stream to lanes 122, 124, 126, and 128 in a first transaction as follows: bit-0 to lane 122, bit-1 to lane 124, bit 2 to lane 126, and bit 3 to lane 128. The first transaction is sent on lanes 122, 124, 126, and 128 to receiver 130, where bit steering logic 132 receives the first four (4) bits (0,1,2,3) of the bit stream and provides them in their proper order to serial data stream receiver 132. In a second transaction, bit steering logic 114 provides the second four (4) bits (4,5,6,7) of the bit stream to lanes 122, 124, 126, and 128 as follows: bit-4 to lane 122, bit-5 to lane 124, bit 6 to lane 126, and bit 7 to lane 128. The second transaction is sent on lanes 122, 124, 126, and 128 to receiver 130, where bit steering logic 132 receives the second four (4) bits (4,5,6,7) of the bit stream and provides them in their proper order to serial data stream receiver 132, thereby completing the transmission of the full bit stream (0,1,2,3,4,5,6,7) across link 100. Note that link 100 may transmit the data stream in accordance with an encoding scheme. For example, a first or second generation PCIe link may employ an 8-bit-to-10-bit (8b10b) encoding scheme where 8 bits of data steered to a particular lane 122, 124, 126, or 128 are encoded as 10 bits of data, thus necessitating ten (10) transactions to communicate eight (8) bits of data. Similarly, a third or fourth generation PCIe link may employ a 128B130B encoding scheme. The skilled artisan will recognize that steering logic 114 may therefore include encoding logic for each of lanes 122, 124, 126, and 126 that is configured to encode the bit stream, and that likewise bit steering logic 132 may include decoding logic for each of the lanes, as needed or desired. As described herein, bit steering logic may be shown in a simplified form that does not include encoding logic, but such simplified depictions are should be understood to include additional logic to enable such encoding schemes as are needed or desired.

Lanes 122, 124, 126, and 128 are shown as operating at a highest speed, that is, at a highest bandwidth, in order to maximize the data throughput of link 100. In a particular embodiment, the highest speed represents a selection of a highest available bandwidth setting for link 100. For example, where each of lanes 122, 124, 126, and 128 are capable of transmitting data at a selected one of three bandwidth settings, a high, a medium, and a low bandwidth, the highest speed can represent a selection of the high bandwidth setting. In another embodiment, the highest bandwidth represents a selection of a highest attainable bandwidth from among a selection of available bandwidths. For example, where each of lanes 122, 124, 126, and 128 are capable of transmitting data at a selected one of three bandwidth settings, a high, a medium, and a low bandwidth, the highest bandwidth can represent a bandwidth setting that is determined in response to a link training sequence that determines whether or not link 100 can reliably operate at the selected bandwidth setting. Here, lanes 122, 124, 126, and 128 can be set to transmit at a highest bandwidth setting by transmitter 110, a training sequence can be provided by the transmitter on each of the lanes, and a bit error rate (BER) for each lane can be determined by receiver 130. If each lane meets a desired BER, then receiver 130 communicates to transmitter 110 that the selected bandwidth setting is to be used as the highest speed. If not, then receiver 130 communicates to transmitter 110 that the selected bandwidth setting is not to be used as the highest speed, lanes 122, 124, 126, and 128 can be set to transmit at a next highest bandwidth setting by the receiver, the training sequence can again be provided on each of the lanes by the transmitter, and a new BER for each lane can be determined by receiver 130. This process can be repeated until a bandwidth setting is found for which each of lanes 122, 124, 126, and 128 reliably meet the desired BER. That bandwidth setting is then selected as the highest speed in transmitter 110 and in receiver 130. An example of a desired BER can include between $10^{-12}$ and $10^{-15}$ errors per bit. Table 1, below, illustrates the operational throughput, in giga-bytes per second (GB/s), for various configurations of PCIe links, including ×4, ×8, and ×16 PCIe links operating at Gen. 1, Gen. 2, Gen. 3, and Gen. 4 transfer rates, in giga-transfers per second (GT/s). Not that all throughputs shown herein are approximate, and the skilled artisan will understand that the selection of an encoding scheme will reduce the actual throughputs slightly. Note further that in training link 100, transmitter 110 and receiver 130 are described as being in communication with each other. It will be understood that communications from transmitter 110 to receiver 130 can be provided via one or more of lanes 122, 124, 126, and 128, or via an out-of-band communication link, not illustrated, between the transmitter and the receiver, and that communications between the receiver and the transmitter can be provided via one or more lanes of a complimentary serial communication link, not illustrated, configured to provide data communication back from the receiver side to the transmitter side, or via the out-of-band communication link.

TABLE 1

PCIe Operational Throughput

| Version | Encoding | Transfer Rate (GT/s) | Throughput (GB/s) | | |
|---|---|---|---|---|---|
| | | | X4 | X8 | X16 |
| Gen. 1 | 8B10B | 2.5 | 1 | 2 | 4 |
| Gen. 2 | 8B10B | 5.0 | 2 | 4 | 8 |
| Gen. 3 | 128B130B | 8.0 | 4 | 8 | 16 |
| Gen. 4 | 128B130B | 16 | 8 | 16 | 32 |

Link 100 operates to monitor each of lanes 122, 124, 126, and 128 to determine if the lanes are continuously meeting the desired BER, based upon a number of transactions that occur that necessitate a retry. For example, where link 100 transmits data in accordance with an encoding scheme, the encoding scheme can be designed to detect single-bit transmission errors, and the link can track the number of bit errors as a function of the number of bits transferred to determine a current BER. Then, when a particular lane 122, 124, 126, or 128 experiences a current BER that is lower than the desired BER, then link 100 lowers the throughput of the link to ensure that the current BER on all lanes remains above the desired BER. In a particular embodiment, not illustrated, when a particular lane 122, 124, 126, or 128 experiences a current BER that is lower than the desired BER, then link 100 lowers the throughput of the link by decreasing the speed of all of the lanes to the next lower transfer rate, thereby effectively reducing the throughput of the link by half. For example, if link 100 is operating at a Gen. 4 speed where lanes 122, 124, 126, and 128 are each operating at 16 GT/s, and one of the lanes experiences a current BER that is lower than the desired BER, then link 100 can perform a retraining of each of the lanes as a Gen. 3 speed of 8 GT/s. In another embodiment, not illustrated, when a particular lane 122, 124, 126, or 128 experiences a current BER that is lower than the desired BER, then link 100 lowers the throughput of the link by decreasing the number of lanes that participate in the link, while maintaining the throughput of each remaining lane at the highest speed, again effectively reducing the throughput of the link by half. For example, if one of lanes 122, 124, 126, and 128 experiences a current BER that is lower than the desired BER, then link 100 can perform a retraining as a ×2 link that excludes the lane that experienced the low current BER. Table 2, below, illustrates the throughput for various configurations of PCIe links that include a lane that is experiencing a current BER that is lower than the desired BER under either of the above embodiments that effectively reduce the throughput of the link by half.

TABLE 2

PCIe Reduced Operational Throughput
(Half Speed or Half Lanes)

| Version | Reduced Throughput (GB/s) | | |
|---|---|---|---|
| | X4 | X8 | X16 |
| Gen. 1 | 0.5 | 1 | 2 |
| Gen. 2 | 1 | 2 | 3 |
| Gen. 3 | 2 | 4 | 8 |
| Gen. 4 | 4 | 8 | 16 |

In another embodiment, when a particular lane 122, 124, 126, or 128 of link 100 experiences a current BER that is lower than the desired BER, then the link lowers the throughput of the link by decreasing the speed of only the effected lane, while maintaining the speed of other lanes at their previously selected speed. Here, link 100 operates to re-distribute the serial data across lanes 122, 124, 126, and 128 based upon the performance of each lane. For example, where the next highest bandwidth setting for a lane experiencing a low current BER is half of the previously selected bandwidth setting, then link 100 will select the next highest bandwidth setting for the particular lane, and will provide two (2) bits to each of the other lanes operating at the previously selected bandwidth setting for each one (1) bit provided to the particular lane.

TABLE 3

PCIe Reduced Operational Throughput
(Single-Lane Reduction)

| Version | Reduced Throughput (GB/s) | | |
|---|---|---|---|
| | X4 | X8 | X16 |
| Gen. 1 | 0.875 | 1.875 | 3.875 |
| Gen. 2 | 1.75 | 3.75 | 7.75 |
| Gen. 3 | 3.5 | 7.5 | 15.5 |
| Gen. 4 | 7 | 15 | 31 |

Figure 2:
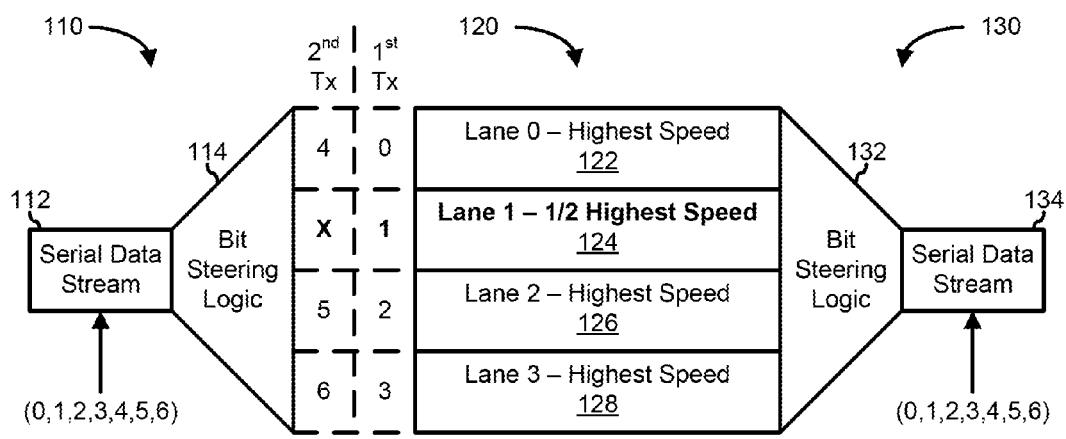
FIG. 2 is a block diagram of an embodiment of the serial communication link of FIG. 1.

Thus, in link 100 as illustrated in FIG. 2, lane 124 has been determined as having a lower current BER than the desired BER, and link 100 sets the lane to a lower speed that provides one half the throughput of the originally selected bandwidth. Here, serial data stream 112 is shown receiving a bit stream (0,1,2,3,4,5,6). Bit steering logic 114 provides the first four (4) bits (0,1,2,3) of the bit stream to lanes 122, 124, 126, and 128 in a first transaction as follows: send bit-0 to lane 122, send bit-1 to lane 124, send bit 2 to lane 126, and send bit 3 to lane 128. The first transaction is sent on lanes 122, 124, 126, and 128 to receiver 130, where bit steering logic 132 receives the first four (4) bits (0,1,2,3) of the bit stream and provides them in their proper order to serial data stream receiver 132. In a second transaction, bit steering logic 114 provides the next three (3) bits (4,5,6) of the bit stream to lanes 122, 126, and 128, skipping lane 124, as follows: send bit-4 to lane 122, send no data on lane 124, send bit-5 to lane 126, and send bit 6 to lane 128. The second transaction is sent on lanes 122, 126, and 128 to receiver 130, where bit steering logic 132 receives the next three (3) bits (4,5,6) of the bit stream, ignoring lane 124, and provides the next three (3) bits in their proper order to serial data stream receiver 132, thereby completing the transmission of the full bit stream (0,1,2,3,4,5,6) across link 100. Note that, where link 100 transmits the data stream in accordance with an encoding scheme, the skilled artisan will recognize that steering logic 114 may include encoding logic for each of lanes 122, 124, 126, and 126 that is configured to encode the bit stream for the lane that is operating at the reduced bandwidth setting, and that likewise bit steering logic 132 may include decoding logic for each of the lanes to decode the bit stream for the lane that is operating at the reduced bandwidth setting, as needed or desired. Table 3, above, illustrates the throughput for various configurations of PCIe links that include a lane that is experiencing a current BER that is lower than the desired BER under the above embodiment where only the effected lane is set to the next highest bandwidth setting.

Where a link includes four (4) lanes, the throughput of the reduced throughput configuration is reduced because, where in the normal configuration, eight (8) bits are transferred in two (2) transactions, in the reduced throughput configuration, only seven (7) bits are transferred in two (2) transactions. As such the reduced throughput is nearly equal to 0.875× of the original throughput, a 75% increase over detuning all lanes or reducing the number of lanes by half. Similarly, where a link includes 16 lanes, the throughput of the reduced throughput configuration is reduced because, where in the normal configuration, 16 bits are transferred in two (2) transactions, in the reduced throughput configuration, only 15 bits are transferred in two (2) transactions. As such the reduced throughput is nearly equal to 0.9375× of the original throughput, a 87.5% increase over detuning all lanes or reducing the number of lanes by half. Finally, where a link includes 32 lanes, the throughput of the reduced throughput configuration is reduced because, where in the normal configuration, 64 bits are transferred in two (2) transactions, in the reduced throughput configuration, only 63 bits are transferred in two (2) transactions. As such the reduced throughput is nearly equal to 0.9844× of the original throughput, a 96.95% increase over detuning all lanes or reducing the number of lanes by half.

In determining whether or not a particular lane 122, 124, 126, or 128 is experiencing a current BER that is lower than the desired BER, link 100 can provide a first BER threshold, such that whenever the current BER for a lane falls below the first BER threshold, the link operates to detune the bandwidth setting for the particular lane. Further, link 100 can provide a second BER threshold that represents a lower error rate than the first BER threshold, such that whenever the current BER for a lane falls below the second BER threshold for a pre-determined amount of time, the link operates to detune the bandwidth setting for the particular lane. For example, the first BER threshold may be set to $10^{12}$ errors per bit, the second BER threshold may be set to $10^{14}$ errors per bit, the pre-determined amount of time may be set to 10 minutes. Here, if the current BER for a particular lane falls to $10^{13}$ errors per bit, for less than 10 minutes, no action is taken to detune the lane, but if the current BER remains below $10^{14}$ errors per bit for longer than 10 minutes, then the link can operate to detune the lane. Further, if the current BER ever falls below $10^{12}$ errors per bit, the link can immediately detune the lane. In a particular embodiment, when one of lanes 122, 124, 126, and 128 is determined to have a low current BER and link 100 has detuned the particular lane, the link can attempt to recover the lane by attempting to retrain the link at the highest speed. Then, if the particular lane 122, 124, 126, or 128 is able to maintain the desired BER, then link 100 can select the highest bandwidth setting for all lanes, thereby recovering the original throughput. For example, link 100 can attempt to recover the particular lane 122, 124, 126, or 128 after one (1) hour, after eight (8) hours, after one (1) day, or after another duration, as needed or desired.

In a particular embodiment, link 100 operates to detect when one or more additional lanes 122, 124, 126, or 128 experiences a current BER that is lower than the desired BER, then the link lowers the throughput of the link by decreasing the speed of each of the effected lanes, while maintaining the speed of other lanes at their previously selected speed. Here, link 100 operates to re-distribute the serial data across lanes 122, 124, 126, and 128 based upon the performance of each lane. For example, where the next highest bandwidth setting for each lane experiencing a low current BER is half of the previously selected bandwidth setting, then link 100 will select the next highest bandwidth setting for those lanes, and will provide two (2) bits to each of the other lanes operating at the previously selected bandwidth setting for each one (1) bit provided to the particular lanes. In another embodiment, link 100 operates to detect when a lane 122, 124, 126, or 128 that previously experienced a current BER that was lower than the desired BER, and that was detuned to a next highest bandwidth setting, is again experiencing a current BER rate that is lower than an desired BER for the new bandwidth setting, and the link again lowers the throughput of the link by decreasing the speed of each of the effected lane to a second next highest bandwidth setting, while maintaining the speed of other lanes at their previously selected speed. Here, link 100 operates to re-distribute the serial data across lanes 122, 124, 126, and 128 based upon the performance of each lane.

For example, where the second next highest bandwidth setting for the lane experiencing the low current BER is one quarter of the previously selected bandwidth setting, then link 100 will select the second next highest bandwidth setting for that lane, and will provide four (4) bits to each of the other lanes operating at the previously selected bandwidth setting for each one (1) bit provided to the particular lane. In yet another embodiment, link 100 can both detune multiple lanes and also detune each lane by multiple bandwidth settings, as needed or desired.

Figure 3:
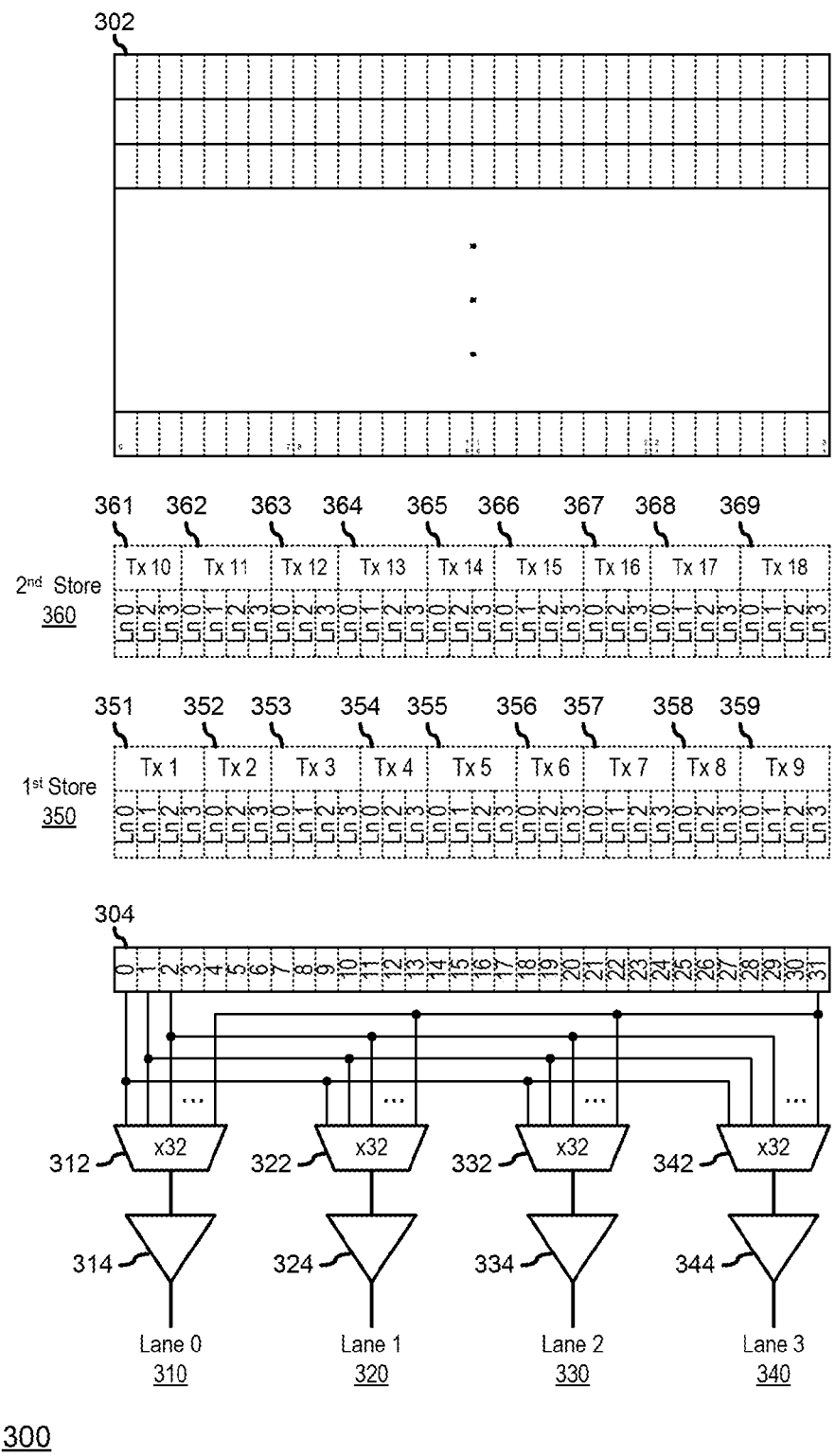
FIG. 3 is a block diagram of an embodiment of a transmitter for implementing the embodiment of the serial communication link of FIG. 2.

FIG. 3 illustrates a transmitter 300 for a serial communication link similar to link 100, configured to implement the bit sorting logic as describe in FIG. 2. As such, transmitter 300 operates similar to transmitter 110 to selectively detune one or more lanes based upon a determination of a current BER for each of the lanes, as described above. Transmitter 300 includes a data buffer 302 configured to receive serial data for transmission over lanes 310, 320, 330, and 340 to a receiver, not illustrated. Data buffer 302 includes multiple data storage locations, such as data registers, memory locations, or the like. As illustrated, data buffer 302 is configured in rows that are each 32-bits wide. Data buffer 302 is configured to provide one row of data to a steering register 304 that is also 32-bits wide. Lane 310 includes a 32-to-1 multiplexor 312, and a lane driver 314, lane 320 includes a 32-to-1 multiplexor 322, and a lane driver 324, lane 330 includes a 32-to-1 multiplexor 332, and a lane driver 334, and lane 340 includes a 32-to-1 multiplexor 342, and a lane driver 344. Each bit of steering register 304 is connected to a respective input of multiplexor 312, to a respective input of multiplexor 322, to a respective input of multiplexor 332, and to a respective input of multiplexor 342. Steering logic of transmitter 300, not illustrated, is connected to the control inputs of each of multiplexors 312, 322, 332, and 342 to select a particular bit from steering register 304 to be provided to associated lane driver 314, 324, 334, and 344 for transmission to the receiver.

FIG. 3 further illustrates storing first data from data buffer 302 to steering register 304 in a first store operation 350, and storing second data from the data buffer to the steering register in a second store operation 360. Here, it is assumed that lane 320 has been detuned to a bandwidth setting that provide a throughput that is one half of the throughput of lanes 310, 330, and 340. Here, after first store operation 350, the steering logic directs bits 0, 1, 2, and 3 from steering register 304 to lanes 310, 320, 330, and 340, respectively in a first transaction 351. In a next transaction 352, the steering logic directs bits 4, 5, and 6 to lanes 310, 330, and 340, respectively. As such, in the first two transactions 351 and 352, seven (7) bits from steering register 304 will have been transmitted to the receiver. The steering logic directs steering register 304 to send the next seven (7) bits in transactions 353 and 354, the next seven (7) bits in transactions 355 and 356, and the next seven (7) bits in transactions 357 and 358. The last four (4) bits from steering register 304 are sent in transaction 359. When all bits from first store operation 350 have been selected for transmission to the receiver, the next row of data from data buffer 302 is stored to steering register 304 in second store operation 360. In a tenth transaction bits 1, 2, and 3 from steering register 304 are directed to lanes 310, 330, and 340. The steering logic directs steering register 304 to send the next seven (7) bits in transactions 362 and 363, the next seven (7) bits in transactions 364 and 365, the next seven (7) bits in transactions 366 and 367, and the final seven (7) bits in transactions 368 and 369.

In a particular embodiment, transmitter 300 includes a second steering register, similar to steering register 304 that is likewise multiplexed to lanes 310, 320, 330, and 340. Here, while the steering logic is consuming the data from steering register 304, new data can be stored to the second steering register from data buffer 302. Then when all of the data has been consumed form steering register 304, the steering logic can proceed to consume the data from the second steering register and new data can be stored to steering register 304. Note that, because each bit of steering register 304 is multiplexed to each of lanes 310, 320, 330, and 340, receiver 300 can easily detune one or more of the lanes and can likewise detune any particular lane by one or more bandwidth settings. Note that transmitter 300, as illustrated, shows a particular scheme for bit sorting logic, but this is not a limiting embodiment, and other schemes for providing bit sorting logic, including the use of a barrel shifter, a state machine, a programmable logic device, or another scheme for implementing a bit sorting logic may be utilized, as needed or desired.

Figure 4:
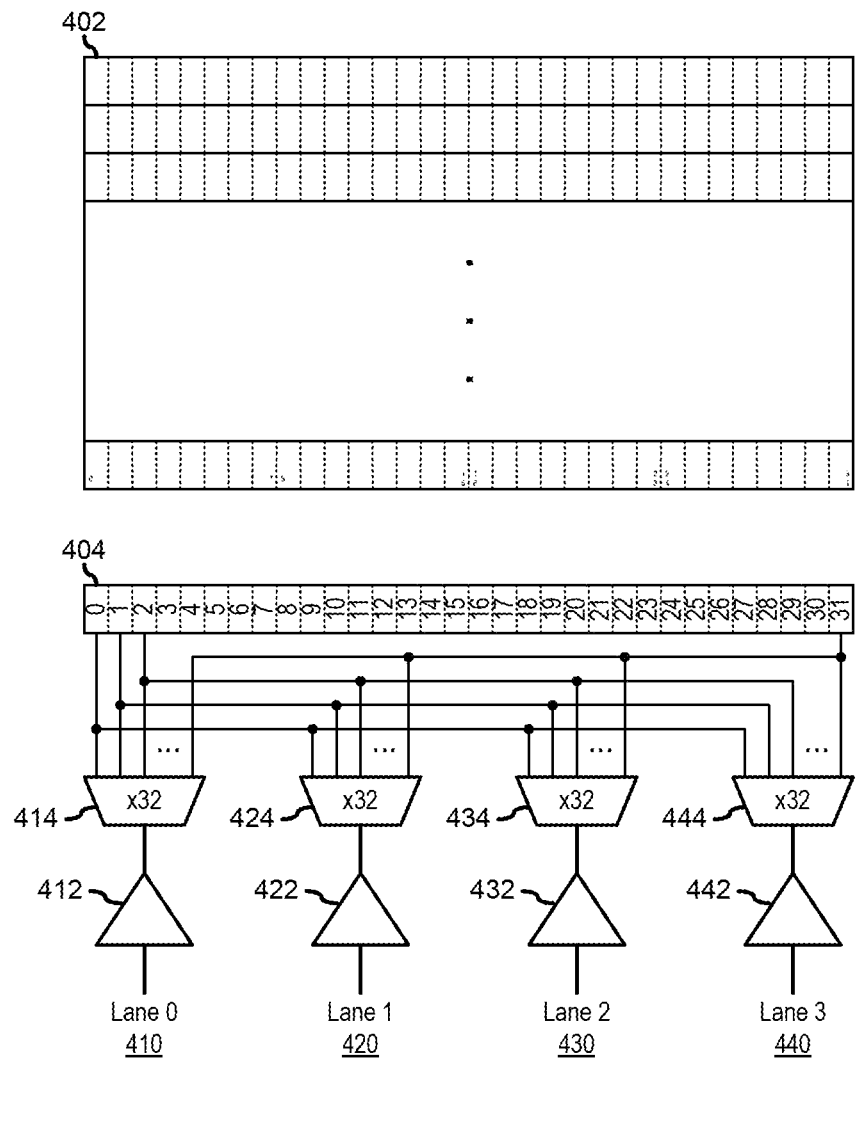
FIG. 4 is a block diagram of an embodiment of a receiver for implementing the embodiment of the serial communication link of FIG. 2.

FIG. 4 illustrates a receiver 400 for a serial communication link similar to link 100. Receiver 400 operates as the compliment to transmitter 300 to receive data from the one or more lanes from transmitter 300, as described above. Receiver 400 includes a data buffer 402, a steering register 404, and lanes 410, 420, 430, and 440. Lane 410 includes a lane receiver 412 connected to an input of a 1-to-32 de-multiplexor 314, lane 420 includes a lane receiver 422 connected to an input of a 1-to-32 de-multiplexor 424, lane 430 includes a lane receiver 432 connected to an input of a 1-to-32 de-multiplexor 434, and lane 440 includes a lane receiver 442 connected to an input of a 1-to-32 de-multiplexor 444. Lane receivers 412, 422, 432, and 442 receive the serial data from the respective lanes of transmitter 300. Each bit of steering register 304 is connected to a respective output of de-multiplexor 414, to a respective output of de-multiplexor 424, to a respective output of de-multiplexor 434, and to a respective output of de-multiplexor 444. Steering logic of receiver 400, not illustrated, is connected to the control inputs of each of de-multiplexors 414, 424, 434, and 444 to select a particular bit of steering register 404 to which to provide to data from lane receivers 412, 422, 432, and 442. Here, the steering logic operates to steer the data to the bits of steering register 404 for storage in data buffer 402 in accordance with, and complimentarily to the steering of data into the detuned lanes 310, 320, 330, and 340, as described above.

Figure 5:
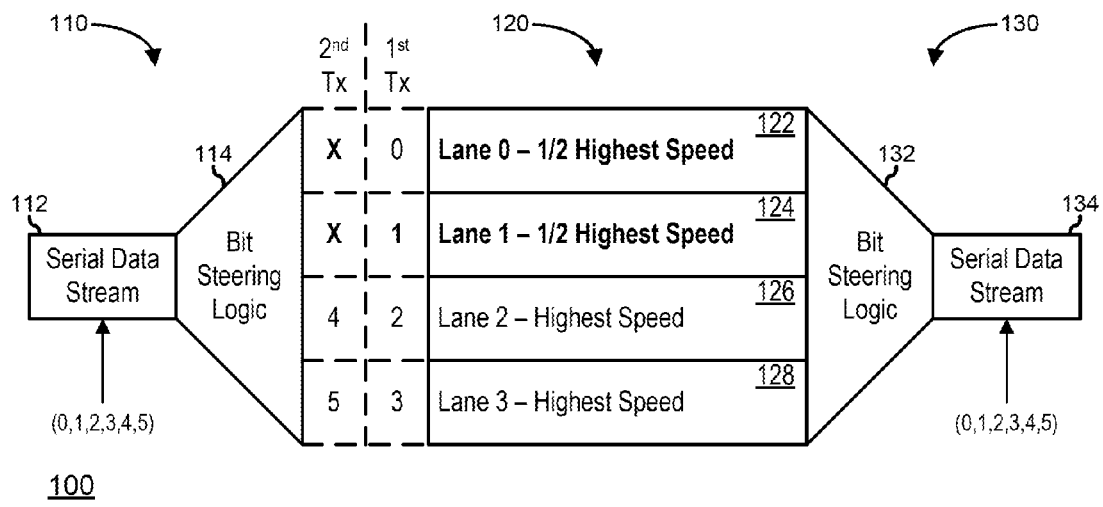
FIG. 5 is a block diagram of an embodiment of the serial communication link of FIG. 1.

Returning to FIG. 1, in another embodiment, when a particular lane 122, 124, 126, or 128 of link 100 experiences a current BER that is lower than the desired BER, then the link lowers the throughput of the link by decreasing the speed of a pair of lanes including the effected lane, while maintaining the speed of other pair of lanes at their previously selected speed. Thus, in link 100 as illustrated in FIG. 5, one or more of lanes 122 and 124 have been determined as having a lower current BER than the desired BER, and link 100 sets the lanes to a lower speed that provides one half the throughput of the originally selected bandwidth. Here, serial data stream 112 is shown receiving a bit stream (0,1,2,3,4,5). Bit steering logic 114 provides the first four (4) bits (0,1,2,3) of the bit stream to lanes 122, 124, 126, and 128 in a first transaction as follows: send bit-0 to lane 122, send bit-1 to lane 124, send bit 2 to lane 126, and send bit 3 to lane 128. The first transaction is sent on lanes 122, 124, 126, and 128 to receiver 130, where bit steering logic 132 receives the first four (4) bits (0,1,2,3) of the bit stream and provides them in their proper order to serial data stream receiver 132. In a second transaction, bit steering logic 114 provides the next two (2) bits (4,5) of the bit stream to lanes 126 and 128, skipping lanes 122 and 124, as follows: send no data on lanes 122 and 124, send bit-4 to lane 126 and send bit-5 to lane 128. The second transaction is sent on lanes 126 and 128 to receiver 130, where bit steering logic 132 receives the next two (2) bits (4,5), of the bit stream, ignoring lanes 122 and 124, and provides the next two (2) bit in their proper order to serial data stream receiver 132, thereby completing the transmission of the full bit stream (0,1,2,3,4,5) across link 100.

Figure 6:
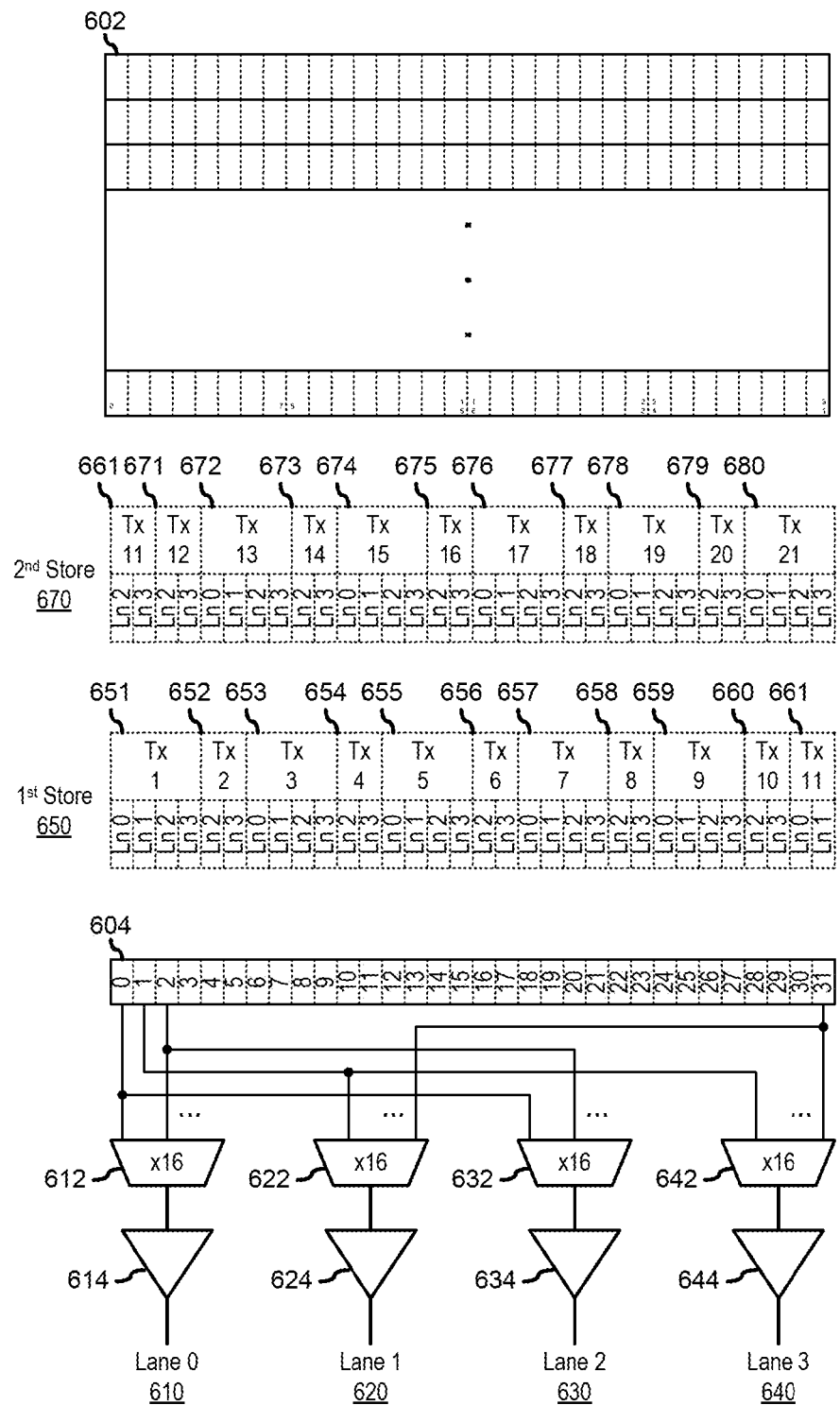
FIG. 6 is a block diagram of an embodiment of a transmitter for implementing the embodiment of the serial communication link of FIG. 5.

FIG. 6 illustrates a transmitter 600 for a serial communication link similar to link 100, configured to implement the bit sorting logic as describe in FIG. 5. As such, transmitter 600 operates similar to transmitter 110 to selectively detune pairs of lanes based upon a determination of a current BER for each of the lanes, as described above. Transmitter 600 includes a data buffer 602 configured to receive serial data for transmission over lanes 610, 620, 630, and 640 to a receiver, not illustrated. Data buffer 602 includes multiple data storage locations, such as data registers, memory locations, or the like. As illustrated, data buffer 602 is configured in rows that are each 32-bits wide. Data buffer 602 is configured to provide one row of data to a steering register 604 that is also 32-bits wide. Lane 610 includes a 16-to-1 multiplexor 612, and a lane driver 614, lane 620 includes a 16-to-1 multiplexor 622, and a lane driver 624, lane 630 includes a 16-to-1 multiplexor 632, and a lane driver 634, and lane 640 includes a 16-to-1 multiplexor 642, and a lane driver 644. Every second bit of steering register 604 is connected to a respective input of multiplexor 612 and to a respective input of multiplexor 632, and each other second bit of the steering register is connected to a respective input of multiplexor 322 and to a respective input of multiplexor 342. Steering logic of transmitter 600, not illustrated, is connected to the control inputs of each of multiplexors 412, 422, 432, and 442 to select a particular bit from steering register 404 to be provided to associated lane driver 414, 424, 434, and 444 for transmission to the receiver. Note that by connecting successive pairs of bits of steering register 404 either to multiplexors 412 and 422 or to multiplexors 432 and 442, the multiplexors can each be configured as 16-to-1 multiplexors, thereby simplifying the design of the bit steering logic of transmitter 600. Similarly, the selection operation of the selection logic can be likewise simplified.

FIG. 6 further illustrates storing first data from data buffer 602 to steering register 604 in a first store operation 650, and storing second data from the data buffer to the steering register in a second store operation 670. Here, it is assumed that lanes 610 and 620 have been detuned to a bandwidth setting that provide a throughput that is one half of the throughput of lanes 630 and 640. Here, after first store operation 650, the steering logic directs bits 0, 1, 2, and 3 from steering register 604 to lanes 610, 620, 630, and 640, respectively in a first transaction 651. In a next transaction 652, the steering logic directs bits 4 and 5 to lanes 630 and 640, respectively. As such, in the first two transactions 651 and 652, six (6) bits from steering register 604 will have been transmitted to the receiver. The steering logic directs steering register 604 to send the next six (6) bits in transactions 653 and 654, the next sis (6) bits in transactions 655 and 656, the next six (6) bits in transactions 657 and 658, and the next six (6) bits in transactions 659 and 660. The last two (2) bits from steering register 604 are sent in an eleventh transaction, transaction 661. When all bits from first store operation 650 have been selected for transmission to the receiver, the next row of data from data buffer 602 is stored to steering register 604 in second store operation 670. In a second portion of the eleventh transaction, transaction 661, bits 1 and 2 from steering register 604 are directed to lanes 630 and 640. Then the steering logic directs steering register 604 to send the next six (6) bits in transactions 671 and 672, the next six (6) bits in transactions 673 and 674, the next six (6) bits in transactions 675 and 676, the next six (6) bits in transactions 677 and 678, and the final six (6) bits in transactions 679 and 680.

In a particular embodiment, transmitter 600 includes a second steering register, similar to steering register 604 that is likewise multiplexed to lanes 610, 620, 630, and 640. Here, while the steering logic is consuming the data from steering register 604, new data can be stored to the second steering register from data buffer 602. Then when all of the data has been consumed form steering register 604, the steering logic can proceed to consume the data from the second steering register and new data can be stored to steering register 604. Note that transmitter 600, as illustrated, shows a particular scheme for bit sorting logic, but this is not a limiting embodiment, and other schemes for providing bit sorting logic, including the use of a barrel shifter, a state machine, a programmable logic device, or another scheme for implementing a bit sorting logic may be utilized, as needed or desired. Note further that, where a serial communication link includes a different number of lanes, bit steering logic in the link can operate to detune different groupings of lanes. For example, when a link includes 16 lanes, the bit steering logic can operate to detune lane pairs, groupings of four (4) lanes, or groupings of eight (8) lanes, as needed or desired to reduce the complexity of the bit steering logic.

Figure 7:
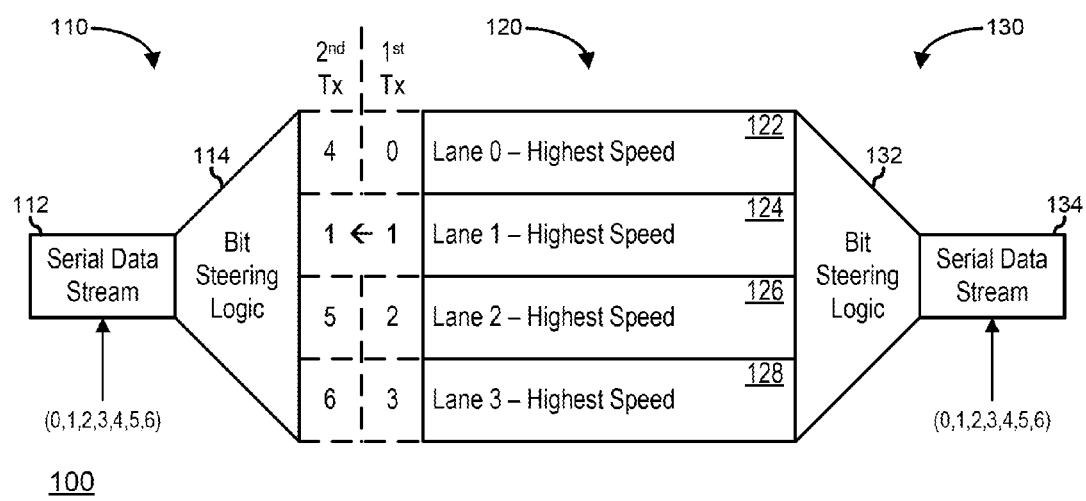
FIG. 7 is a block diagram of an embodiment of the serial communication link of FIG. 1.

Returning to FIG. 1, in another embodiment, when a particular lane 122, 124, 126, or 128 of link 100 experiences a current BER that is lower than the desired BER, then the link maintains the speed of the effected lane, but ensures that the lane data is also maintained for a number of transactions as needed by a next highest bandwidth setting. Thus, in link 100 as illustrated in FIG. 7 lane 124 has been determined as having a lower current BER than the desired BER, and link 100 maintains the lane to at the original speed, but maintains the lane data to simulate the lower speed that provides one half the throughput of the originally selected bandwidth. Here, serial data stream 112 is shown receiving a bit stream (0,1,2,3,4,5,6). Bit steering logic 114 provides the first four (4) bits (0,1,2,3) of the bit stream to lanes 122, 124, 126, and 128 in a first transaction as follows: send bit-0 to lane 122, send bit-1 to lane 124, send bit 2 to lane 126, and send bit 3 to lane 128. The first transaction is sent on lanes 122, 124, 126, and 128 to receiver 130, where bit steering logic 132 receives the first four (4) bits (0,1,2,3) of the bit stream and provides them in their proper order to serial data stream receiver 132. In a second transaction, bit steering logic 114 provides the next three (3) bits (4,5,6) of the bit stream to lanes 122, 126, and 128, skipping lane 124, as follows: send bit-4 on lane 122, maintain bit-1 on lane 124, send bit-5 to lane 126, and send bit-6 to lane 128. The second transaction is sent on lanes 122, 124, 126, and 128 to receiver 130, where bit steering logic 132 receives the next three (3) bits (4,5,6), of the bit stream, ignoring lane 124, and provides the next three (3) bits in their proper order to serial data stream receiver 132, thereby completing the transmission of the full bit stream (0,1,2,3,4,5,6) across link 100.

Figure 8:
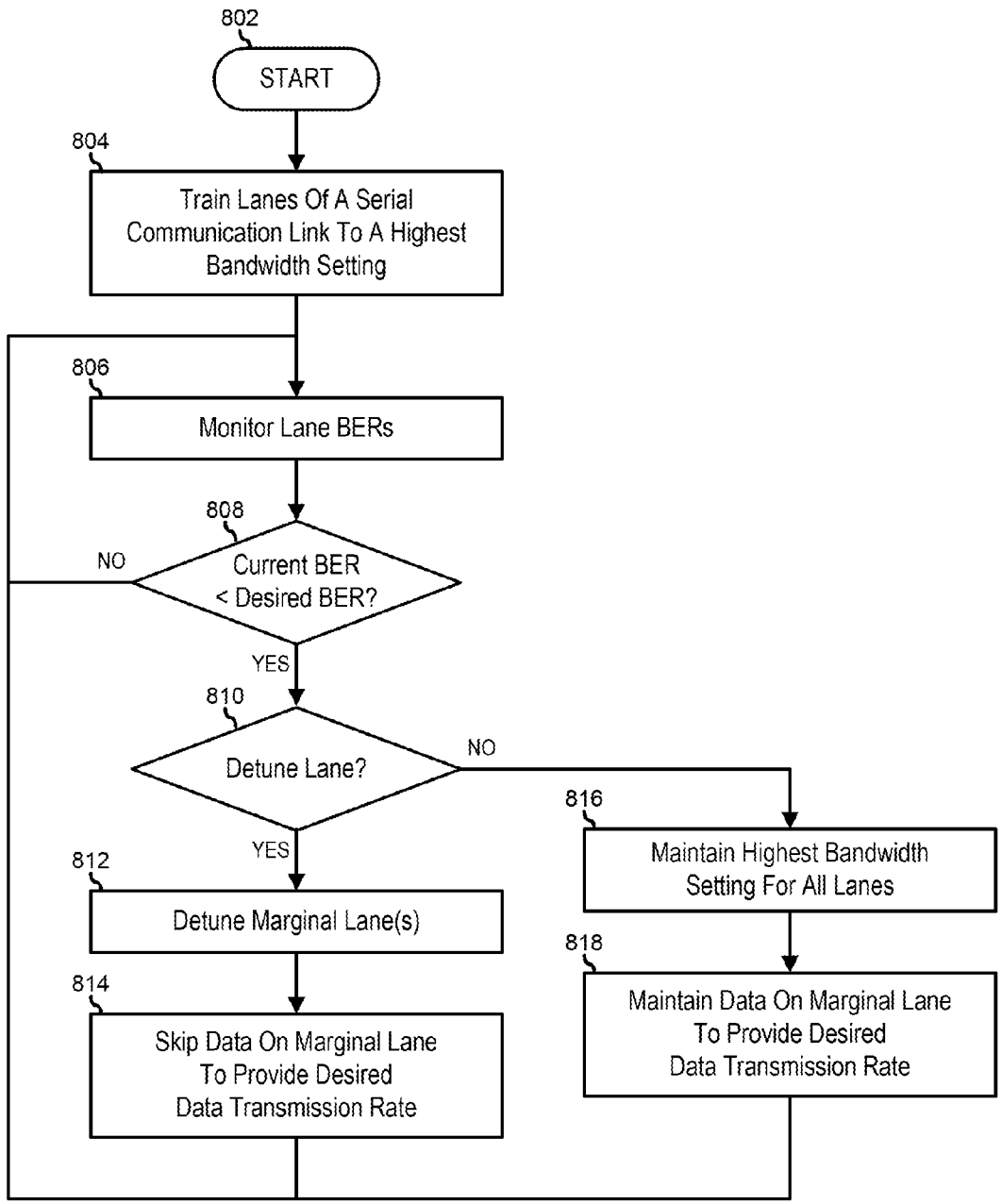
FIG. 8 is a flowchart illustrating a method for optimizing the performance of a serial communication link by operating lanes at different speeds.

FIG. 8 illustrates a method for optimizing the performance of a link by operating lanes at different speeds, starting at block 802. The lanes of a serial communication link are trained to a highest bandwidth setting in block 804. For example, links 122, 124, 126, and 128 can be trained to determine a highest bandwidth setting for which each land can meet a desired BER, based upon a training sequence. Each lane is monitored to determine a current BER for each lane in block 806. For example, a count of errors, retries, or single bit corrections for lanes 122, 124, 126, and 128 can be determined as a function of the number of bits transmitted on each lane. A decision is made as to whether or not the current BER for each lane is less than the desired BER in decision block 808. For example, the current BER can be lower than a first threshold BER at any time, or can be lower than a second threshold BER for a predetermined amount of time. If the current BER for each lane is not less than the desired BER, the "NO" branch of decision block 808 is taken and the method returns to block 806 where each lane is monitored to determine the current BER for each lane.

If the current BER for each lane is less than the desired BER, then the "YES" branch of decision block 808 is taken and a decision is made as to whether or not the lane with the marginal current BER is to be detuned in decision block 810. If so, the "YES" branch of decision block 810 is taken, the lane with the marginal BER is detuned to a next highest bandwidth setting in block 812, the bit steering logic skips data on the marginal lane in proportion to the decrease in bandwidth setting in block 814, and the method returns to block 806 where each lane is monitored to determine the current BER for each lane. If the lane with the marginal current BER is not to be detuned, the "NO" branch of decision block 810 is taken, the highest bandwidth setting is maintained for all lanes in block 816, the data from a first transaction is maintained on the lane with the marginal BER for a number of transactions in proportion to an equivalent bandwidth decrease for a next highest bandwidth setting, and the method returns to block 806 where each lane is monitored to determine the current BER for each lane.

Figure 9:
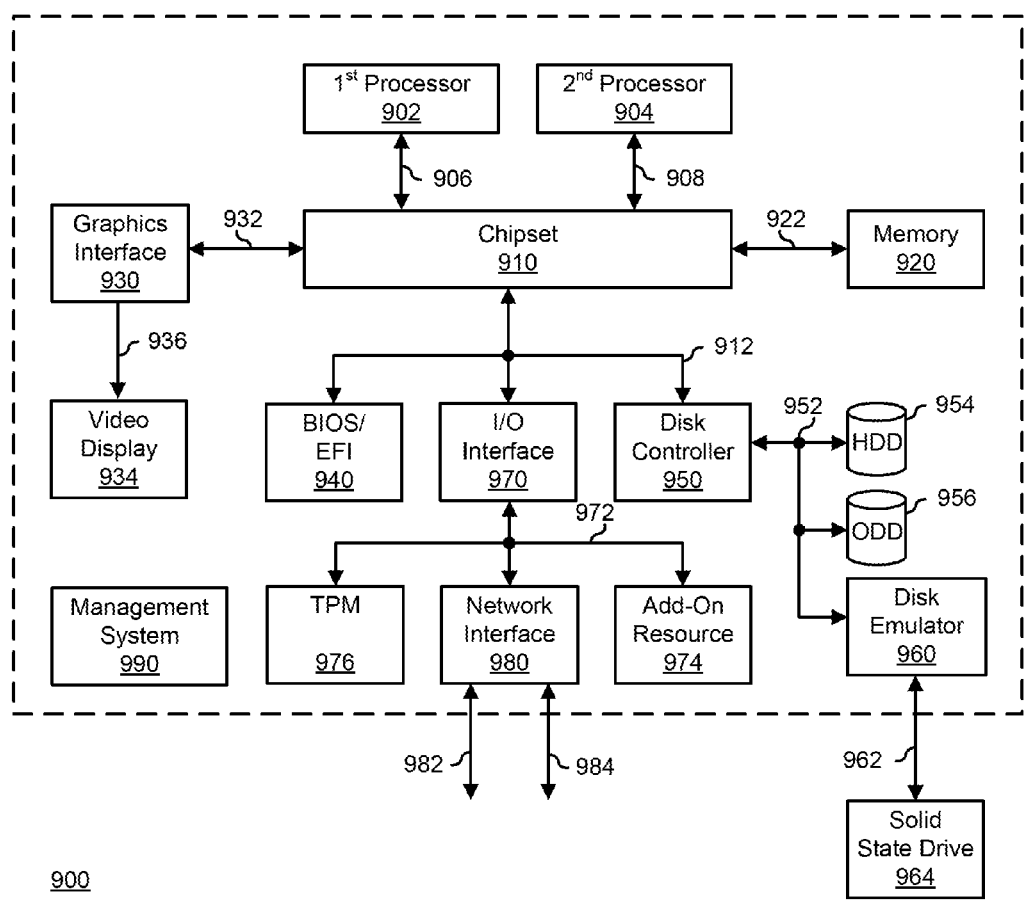
FIG. 9 is a block diagram of a generalized information handling system according to an embodiment of the present disclosure.

FIG. 9 illustrates a generalized embodiment of information handling system 900. For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described above, and operates to perform one or more of the methods described above. Information handling system 900 includes a processors 902 and 904, a chipset 910, a memory 920, a graphics interface 930, include a basic input and output system/extensible firmware interface (BIOS/EFI) module 940, a disk controller 950, a disk emulator 960, an input/output (I/O) interface 970, a network interface 980, and a management system 990. Processor 902 is connected to chipset 910 via processor interface 906, and processor 904 is connected to the chipset via processor interface 908. Memory 920 is connected to chipset 910 via a memory bus 922. Graphics interface 930 is connected to chipset 910 via a graphics interface 932, and provides a video display output 936 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974, to a TPM 976, and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management system 990 provides for out-of-band monitoring, management, and control of the respective elements of information handling system 900, such as cooling fan speed control, power supply management, hot-swap and hot-plug management, firmware management and update management for system BIOS or UEFI, Option ROM, device firmware, and the like, or other system management and control functions as needed or desired. As such, management system 990 provides some or all of the functions and features of the management systems, management controllers, embedded controllers, or other embedded devices or systems, as described herein.

The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A serial communication link, comprising:
  a receiver; and
  a transmitter coupled to the receiver by a first serial communication lane operating at a first speed in a first mode and in a second mode, and by a second serial communication lane operating at the first speed in the first mode and at a second speed in the second mode, the second speed being slower than the first speed.

2. The serial communication link of claim 1, further comprising:
  bit steering logic in the transmitter, the bit steering logic including an input to receive a data stream, a first output coupled to the first serial communication lane, and a second output coupled to the second serial communication lane, the bit steering logic configured to output a first number of bits of the data stream on the first output and to output a second number of bits of the data stream on the second output, wherein the first number of bits is equal to the second number of bits in the first mode, and wherein a proportion of the first number of bits to the second number of bits is the same as a proportion of the first speed to the second speed in the second mode.

3. The serial communication link of claim 1, wherein the receiver is configured to determine a first current bit error rate (BER) for the first serial communication lane while operating in the first mode and a second current BER for the second serial communication lane while operating in the first mode.

4. The serial communication link of claim 3, wherein the transmitter is configured to receive the first and second current BERs from the receiver and to determine that the second current BER is higher than a desired BER.

5. The serial communication link of claim 4, wherein the transmitter is configured to switch operation of the serial communication link from the first mode to the second mode in response to determining that the second current BER is higher than a first desired BER.

6. The serial communication link of claim 5, wherein the receiver is configured to determine a third current BER for the second serial communication lane while operating in the second mode, and the transmitter is configured to receive the third current BER from the receiver and to determine that the third current BER is higher than a second desired BER.

7. The serial communication link of claim 6, wherein the transmitter is configured to switch operation of the serial communication link from the second mode to a third mode in response to determining that the third current BER is higher than a second desire BER, wherein in the third mode a third speed of the second communication lane is slower than the second speed and the speed of the of the first serial communication lane is maintained at the first speed.

8. The serial communication link of claim 1, wherein the serial communication link comprises a Peripheral Component Interconnect-Express (PCIe) serial communication link.

9. The serial communication link of claim 1, wherein the serial communication link comprises one of an InfiniBand communication link, a Fibre Channel communication link, and a Cache Coherency Interconnect for Accelerators (CCIX) communication link.

10. A method comprising:
  coupling a transmitter of a serial communication link to a receiver of the serial communication link via a first serial communication lane and a second serial communication lane;
  operating the first serial communication lane at a first speed in a first mode and in a second mode; and
  operating the second serial communication lane at the first speed in the first mode and at a second speed in the second mode, the second speed being slower than the first speed.

11. The method of claim 10, further comprising:
  receiving, at bit steering logic in the transmitter, a data stream;
  providing, from the bit steering logic, a first number of bits of the data stream to the first serial communication lane; and
  providing, from the bit steering logic, a second number of bits of the data stream to the second serial communication lane, wherein the first number of bits is equal to the second number of bits in the first mode, and wherein a proportion of the first number of bits to the second number of bits is the same as a proportion of the first speed to the second speed in the second mode.

12. The method of claim 10, further comprising:
  determining, by the receiver, a first current bit error rate (BER) for the first serial communication lane while operating in the first mode and a second current BER for the second serial communication lane while operating in the first mode.

13. The method of claim 12, further comprising:
  receiving, by the transmitter, the first and second current BERs from the receiver; and
  determining that the second current BER is higher than a desired BER.

14. The method of claim 13, further comprising:
  switching, by the transmitter, an operation of the serial communication link from the first mode to the second mode in response to determining that the second current BER is higher than a first desired BER.

15. The method of claim 14, further comprising:
determining, by the receiver, a third current BER for the second serial communication lane while operating in the second mode;
receiving, by the transmitter, the third current BER from the receiver; and
determining, by the transmitter, that the third current BER is higher than a second desired BER.

16. The method of claim 15, further comprising:
switching, by the transmitter, the operation of the serial communication link from the second mode to a third mode in response to determining that the third current BER is higher than a second desire BER, wherein in the third mode, a third speed of the second communication lane is slower than the second speed; and
maintaining, by the transmitter, the speed of the first serial communication link at the first speed in the third mode.

17. A non-transitory computer-readable medium including code for performing a method, the method comprising:
coupling a transmitter of a serial communication link to a receiver of the serial communication link via a first serial communication lane and a second serial communication lane;
operating the first serial communication lane operating at a first speed in a first mode and in a second mode; and
operating the second serial communication lane operating at the first speed in the first mode and at a second speed in the second mode, the second speed being slower than the first speed.

18. The computer-readable medium of claim 17, the method further comprising:
receiving, at bit steering logic in the transmitter, a data stream;
providing, from the bit steering logic, a first number of bits of the data stream to the first serial communication lane; and
providing, from the bit steering logic, a second number of bits of the data stream to the second serial communication lane, wherein the first number of bits is equal to the second number of bits in the first mode and a proportion of the first number of bits to the second number of bits is the same as a proportion of the first speed to the second speed in the second mode.

19. The computer-readable medium of claim 17, the method further comprising:
determining, by the receiver, a first current bit error rate (BER) for the first serial communication lane while operating in the first mode and a second current BER for the second serial communication lane while operating in the first mode;
receiving, by the transmitter, the first and second current BERs from the receiver; and
determining that the second current BER is higher than a desired BER.

20. The computer-readable medium of claim 19, the method further comprising:
switching, by the transmitter, an operation of the serial communication link from the first mode to the second mode in response to determining that the second current BER is higher than a first desired BER.

* * * * *